US012771509B2

(12) United States Patent
Guo

(10) Patent No.: US 12,771,509 B2
(45) Date of Patent: Oct. 20, 2026

(54) APPARATUS AND METHODS OF UPLINK TRANSMISSION WITH MULTIPLE PANELS

(71) Applicant: GUANGDONG OPPO MOBILE TELECOMMUNICATIONS CORP., LTD., Dongguan (CN)

(72) Inventor: Li Guo, Allen, TX (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 395 days.

(21) Appl. No.: 18/231,661

(22) Filed: Aug. 8, 2023

(65) Prior Publication Data

US 2025/0055639 A1 Feb. 13, 2025

Related U.S. Application Data

(60) Provisional application No. 63/351,180, filed on Jun. 10, 2022.

(51) Int. Cl.
*H04L 5/00* (2006.01)
*H04W 72/20* (2023.01)

(52) U.S. Cl.
CPC .......... *H04L 5/0053* (2013.01); *H04L 5/0094* (2013.01); *H04W 72/20* (2023.01)

(58) Field of Classification Search
USPC .... 370/229, 230, 230.1, 236, 252, 328, 329, 370/330, 431
See application file for complete search history.

(56) References Cited

U.S. PATENT DOCUMENTS

| | | | | |
|---|---|---|---|---|
| 2022/0304018 | A1* | 9/2022 | Ko | H04L 1/08 |
| 2023/0353317 | A1* | 11/2023 | Cirik | H04L 5/0051 |
| 2025/0159693 | A1* | 5/2025 | Matsumura | H04L 5/0023 |
| 2025/0193889 | A1* | 6/2025 | Muruganathan | H04L 5/0023 |
| 2025/0300781 | A1* | 9/2025 | Liu | H04L 5/0051 |

* cited by examiner

*Primary Examiner* — Nguyen H Ngo
(74) *Attorney, Agent, or Firm* — BAYES PLLC

(57) ABSTRACT

A method of uplink transmission with multiple panels, by a user equipment (UE) includes being configured, by a base station, with a plurality of sounding reference signal (SRS) resource sets, wherein the SRS resource sets include a first SRS resource set and a second SRS resource set; being configured, by the base station, with a plurality of transmission configuration indicator (TCI) states associated with an uplink transmission, wherein the TCI states include a first TCI state and a second TCI state; and being indicated, by the base station, to transmit the uplink transmission with the first TCI state and/or the second TCI state.

20 Claims, 4 Drawing Sheets

APPARATUS AND METHODS OF UPLINK TRANSMISSION WITH MULTIPLE PANELS

CROSS REFERENCE TO RELATED APPLICATION

This application claims the benefit of priority to U.S. Provisional Application No. 63/351,180, entitled "METHODS AND APPARATUS OF UPLINK TRANSMISSION OF UE WITH MULTIPLE PANELS," filed on Jun. 10, 2022, which is hereby incorporated in its entirety by this reference.

TECHNICAL FIELD

The present disclosure relates to the field of communication systems, and more particularly, to apparatuses and methods of uplink transmission with multiple panels such as solutions for transmitting physical uplink shared channel (PUSCH) and/or physical uplink control channel (PUCCH) towards different multi-transmission/reception points (TRPs) simultaneously from different user equipment (UE) panels.

BACKGROUND

New radio (NR) system introduces a multi-transmission/reception point (TRP) based non-coherent joint transmission. Multiple TRPs are connected through backhaul link for coordination. The backhaul link can be ideal or non-ideal. In the case of ideal backhaul, the TRPs can exchange dynamic physical downlink shared channel (PDSCH) scheduling information with short latency and thus different TRPs can coordinate a PDSCH transmission per PDSCH transmission. While, in non-ideal backhaul case, the information exchange between TRPs has large latency and thus the coordination between TRPs can only be semi-static or static.

The drawback of current uplink transmission scheme for a user equipment (UE) with multiple panels in multi-TRP system is that the specification does not provide optimized solution to support the UE to transmit an uplink transmission such as PUSCH towards different TRPs at the same time from multiple different panels. The current specification does not support to transmit PUCCH from two different panels simultaneously too.

Therefore, there is a need for apparatuses and methods of uplink transmission with multiple panels such as solutions for transmitting physical uplink shared channel (PUSCH) and/or physical uplink control channel (PUCCH) towards different multi-transmission/reception points (TRPs) simultaneously from different user equipment (UE) panels.

SUMMARY

An object of the present disclosure is to propose apparatuses and methods of uplink transmission with multiple panels such as solutions for transmitting physical uplink shared channel (PUSCH) and/or physical uplink control channel (PUCCH) towards different multi-transmission/reception points (TRPs) simultaneously from different user equipment (UE) panels, which can enable a UE to efficiently transmit the uplink transmission (such as PUSCH or PUCCH) with two panels simultaneously so that the performance of uplink link would be improved.

In a first aspect of the present disclosure, a method of uplink transmission with multiple panels, by a user equipment (UE) includes being configured, by a base station, with a plurality of sounding reference signal (SRS) resource sets, wherein the SRS resource sets include a first SRS resource set and a second SRS resource set; being configured, by the base station, with a plurality of transmission configuration indicator (TCI) states associated with an uplink transmission, wherein the TCI states include a first TCI state and a second TCI state; and being indicated, by the base station, to transmit the uplink transmission with the first TCI state and/or the second TCI state.

In a second aspect of the present disclosure, a method of uplink transmission with multiple panels, by a base station includes configuring, to a user equipment (UE), a plurality of sounding reference signal (SRS) resource sets, wherein the SRS resource sets include a first SRS resource set and a second SRS resource set; configuring, to the UE, a plurality of transmission configuration indicator (TCI) states associated with an uplink transmission, wherein the TCI states include a first TCI state and a second TCI state; and receiving, from the UE, the uplink transmission with the first TCI state and/or the second TCI state.

In a third aspect of the present disclosure, a UE includes a memory, a transceiver, and a processor coupled to the memory and the transceiver. The UE is configured to perform the above method.

In a fourth aspect of the present disclosure, a base station includes a memory, a transceiver, and a processor coupled to the memory and the transceiver. The base station is configured to perform the above method.

In a fifth aspect of the present disclosure, a UE includes a determiner and a transmitter. The determiner is configured to determine a plurality of sounding reference signal (SRS) resource sets, wherein the SRS resource sets include a first SRS resource set and a second SRS resource set. The determiner is configured to determine a plurality of transmission configuration indicator (TCI) states associated with an uplink transmission, wherein the TCI states include a first TCI state and a second TCI state. The transmitter is configured to transmit the uplink transmission with the first TCI state and/or the second TCI state.

In a sixth aspect of the present disclosure, a base station includes an allocator and receiver. The allocator is configured to allocate, to a user equipment (UE), a plurality of sounding reference signal (SRS) resource sets, wherein the SRS resource sets include a first SRS resource set and a second SRS resource set. The allocator is further configured to allocate, to the UE, a plurality of transmission configuration indicator (TCI) states associated with an uplink transmission, wherein the TCI states include a first TCI state and a second TCI state. The receiver is configured to receive, from the UE, the uplink transmission with the first TCI state and/or the second TCI state.

In a seventh aspect of the present disclosure, a non-transitory machine-readable storage medium has stored thereon instructions that, when executed by a computer, cause the computer to perform the above method.

In an eighth aspect of the present disclosure, a chip includes a processor, configured to call and run a computer program stored in a memory, to cause a device in which the chip is installed to execute the above method.

In a ninth aspect of the present disclosure, a computer readable storage medium, in which a computer program is stored, causes a computer to execute the above method.

In a tenth aspect of the present disclosure, a computer program product includes a computer program, and the computer program causes a computer to execute the above method.

In an eleventh aspect of the present disclosure, a computer program causes a computer to execute the above method.

BRIEF DESCRIPTION OF THE DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION

Figure 1A:
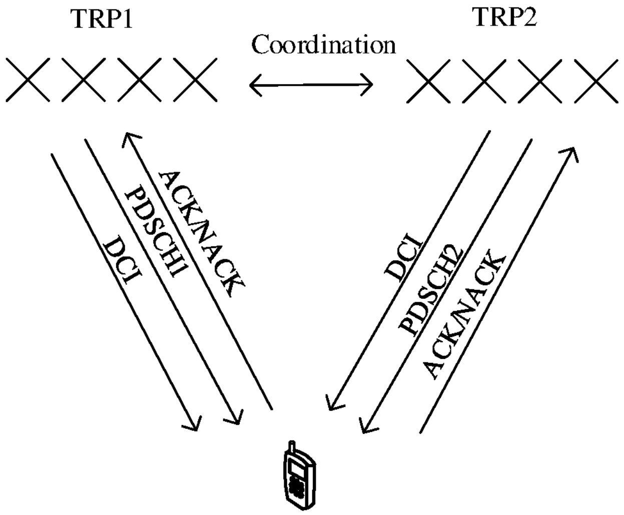
FIG. 1A is a schematic structural diagram of an example of multi-transmission/reception point (TRP) based non-coherent joint transmission.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

The technical solutions of the embodiments of the present disclosure can be applied to various communication systems, such as a global system of mobile communication (GSM) system, a code division multiple access (CDMA) system, a wideband code division multiple access (WCDMA) system, a general packet radio service (GPRS), a long term evolution (LTE) system, a LTE frequency division duplex (FDD) system, a LTE time division duplex (TDD) system, an advanced long term evolution (LTE-A) system, a new radio (NR) system, an evolution system of a NR system, a LTE-based access to unlicensed spectrum (LTE-U) system, a NR-based access to unlicensed spectrum (NR-U) system, an universal mobile telecommunication system (UMTS), a global interoperability for microwave access (WiMAX) communication system, wireless local area networks (WLAN), wireless fidelity (Wi-Fi), a future 5th generation (5G) system (may also be called a new radio (NR) system) or other communication systems, etc.

Optionally, a base station mentioned in the embodiments of the present application can provide a communication coverage for a specific geographic area and can communicate with a user equipment (UE) located in the coverage area. Optionally, the base station may be a gNB, a base transceiver station (BTS) in the GSM or in the CDMA system, or may be a NodeB (NB) in the WCDMA system, or may be an evolutional Node B (eNB or eNodeB) in the LTE system, or a radio controller in a cloud radio access network (CRAN).

The UE may refer to an access terminal, a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, an in-vehicle device, a wearable device, a terminal device in a future 5G network, a terminal device in a future evolved PLMN, etc.

Optionally, the communication system in the embodiment of the present application may be applied to an unlicensed spectrum, where the unlicensed spectrum may also be considered as a shared spectrum; or the communication system in the embodiment of the present application may also be applied to a licensed spectrum, where the licensed spectrum can also be considered an unshared spectrum.

New radio (NR) system introduces a multi-transmission/reception point (TRP) based non-coherent joint transmission. Multiple TRPs are connected through backhaul link for coordination. The backhaul link can be ideal or non-ideal. In the case of ideal backhaul, the TRPs can exchange dynamic physical downlink shared channel (PDSCH) scheduling information with short latency and thus different TRPs can coordinate a PDSCH transmission per PDSCH transmission. While, in non-ideal backhaul case, the information exchange between TRPs has large latency and thus the coordination between TRPs can only be semi-static or static.

Figure 1B:
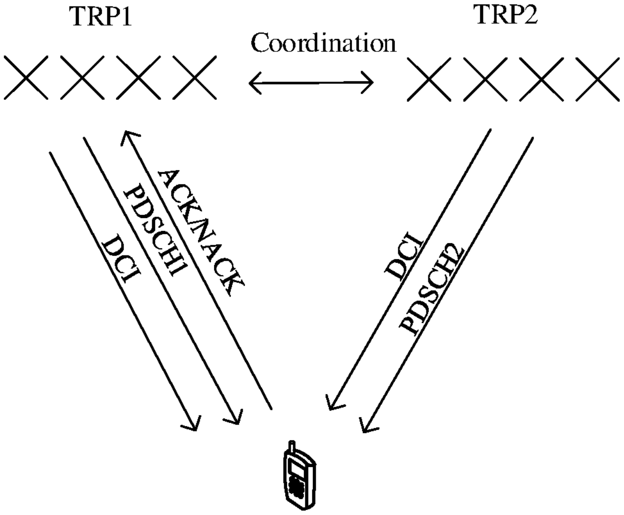
FIG. 1B is a schematic structural diagram of another example of multi-TRP based non-coherent joint transmission.

FIG. 1A illustrates an example of multi-transmission/reception point (TRP) based non-coherent joint transmission. FIG. 1B illustrates another example of multi-TRP based non-coherent joint transmission. FIG. 1A and FIG. 1B illustrate that, in non-coherent joint transmission, different transmission/reception points (TRPs) use different physical downlink control channels (PDCCHs) to schedule physical downlink sharing channel (PDSCH) transmission independently. Each TRP can send one downlink control information (DCI) to schedule one PDSCH transmission. PDSCHs from different TRPs can be scheduled in the same slot or different slots. Two different PDSCH transmissions from different TRPs can be fully overlapped or partially overlapped in PDSCH resource allocation. To support multi-TRP based non-coherent joint transmission, a user equipment (UE) is requested to receive PDCCH from multiple TRPs and then receive PDSCH sent from multiple TRPs. For each PDSCH transmission, the UE can feedback a hybrid automatic repeat request-acknowledge (HARQ-ACK) information to a network. In multi-TRP transmission, the UE can feedback the HARQ-ACK information for each PDSCH transmission to the TRP transmitting the PDSCH. The UE can also feedback the HARQ-ACK information for a PDSCH transmission sent from any TRP to one particular TRP.

An example of multi-TRP based non-coherent joint transmission is illustrated in FIG. 1A. A UE receives a PDSCH based on non-coherent joint transmission from two TRPs: TRP1 and TRP2. As illustrated in FIG. 1A, the TRP1 sends one DCI to schedule a transmission of PDSCH 1 to the UE and the TRP2 sends one DCI to schedule a transmission of PDSCH 2 to the UE. At the UE side, the UE receives and decodes DCI from both TRPs. Based on the DCI from the TRP1, the UE receives and decodes the PDSCH 1 and based on the DCI from the TRP2, the UE receives and decodes the PDSCH 2. In the example illustrated in FIG. 1A, the UE reports HARQ-ACK for PDSCH 1 and PDSCH2 to the TRP1 and the TRP 2, respectively. The TRP1 and the TRP 2 use different control resource sets (CORESETs) and search spaces to transmit DCI scheduling PDSCH transmission to the UE. Therefore, the network can configure multiple CORESETs and search spaces. Each TRP can be associated with one or more CORESETs and also the related search spaces. With such configuration, the TRP would use the associated CORESET to transmit DCI to schedule a PDSCH transmission to the UE. The UE can be requested to decode DCI in CORESETs associated with either TRP to obtain PDSCH scheduling information.

Another example of multi-TRP transmission is illustrated in FIG. 1B. A UE receives PDSCH based on non-coherent joint transmission from two TRPs: TRP1 and TRP2. As illustrated in FIG. 1B, the TRP1 sends one DCI to schedule a transmission of PDSCH 1 to the UE and the TRP2 sends one DCI to schedule the transmission of PDSCH 2 to the UE. At the UE side, the UE receives and decodes DCI from both TRPs. Based on the DCI from the TRP1, the UE receives and decodes the PDSCH 1 and based on the DCI from the TRP2, the UE receives and decodes the PDSCH 2. In the example illustrated in FIG. 1B, the UE reports HARQ-ACK for both PDSCH 1 and PDSCH2 to the TRP, which is different from the HARQ-ACK reporting in the example illustrated in FIG. 1A. The example illustrated in FIG. 1B needs ideal backhaul between the TRP 1 and the TRP 2, while the example illustrated in FIG. 1A can be deployed in the scenarios that the backhaul between the TRP 1 and the TRP 2 is ideal or non-ideal.

The drawback of current uplink transmission scheme for a user equipment (UE) with multiple panels in multi-TRP system is that the specification does not provide optimized solution to support the UE to transmit an uplink transmission such as PUSCH towards different TRPs at the same time from multiple different panels. The current specification does not support to transmit PUCCH from two different panels simultaneously too.

Therefore, there is a need for apparatuses and methods of uplink transmission with multiple panels such as solutions for transmitting physical uplink shared channel (PUSCH) and/or physical uplink control channel (PUCCH) towards different multi-transmission/reception points (TRPs) simultaneously from different user equipment (UE) panels. The proposed some embodiments can enable a UE to efficiently transmit the uplink transmission (such as PUSCH or PUCCH) with two panels simultaneously so that the performance of uplink link would be improved.

Figure 2:
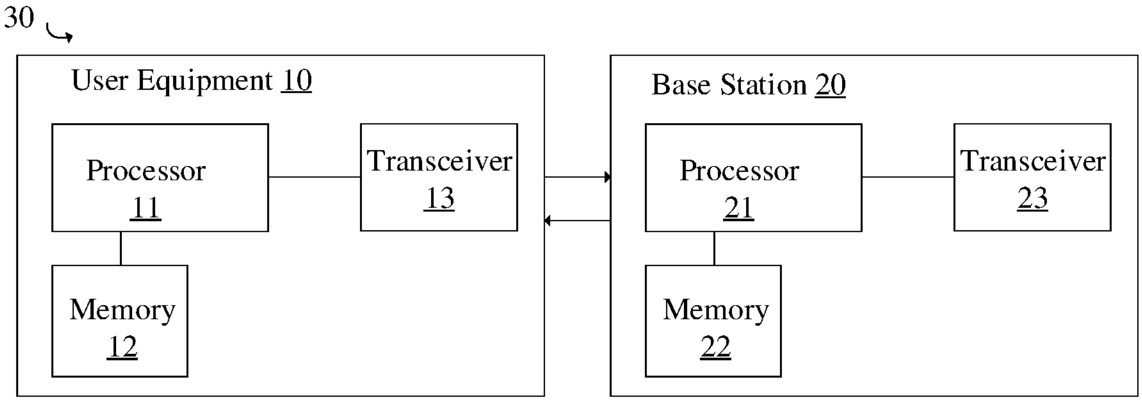
FIG. 2 is a block diagram of one or more user equipments (UEs) and a base station of communication in a communication network system according to an embodiment of the present disclosure.

FIG. 2 illustrates that, in some embodiments, one or more user equipments (UEs) 10 and a base station (e.g., next generation NodeB (gNB) or eNB) 20 of communication in a communication network system 30 (e.g., an NR system) according to an embodiment of the present disclosure are provided. The communication network system 30 includes the one or more UEs 10 and the base station 20. The one or more UEs 10 may include a memory 12, a transceiver 13, and a processor 11 coupled to the memory 12 and the transceiver 13. The base station 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured, by the base station 20, with a plurality of sounding reference signal (SRS) resource sets, wherein the SRS resource sets include a first SRS resource set and a second SRS resource set. The processor 11 is further configured, by the base station 20, with a plurality of transmission configuration indicator (TCI) states associated with an uplink transmission, wherein the TCI states include a first TCI state and a second TCI state. The transceiver 13 is indicated, by the base station 20, to transmit the uplink transmission with the first TCI state and/or the second TCI state. This can solve issues in the prior art, utilize multi-transmission/reception point (TRP) reception, improve uplink reliability, provide a good communication performance, and/or provide high reliability. Further, the proposed some embodiments can enable a UE to efficiently transmit the uplink transmission (such as PUSCH or PUCCH) with two panels simultaneously so that the performance of uplink link would be improved.

In some embodiments, the processor 21 may configure, to the user equipment (UE) 10, a plurality of sounding reference signal (SRS) resource sets, wherein the SRS resource sets include a first SRS resource set and a second SRS resource set. The processor 21 may further configure, to the user equipment (UE) 10, a plurality of transmission configuration indicator (TCI) states associated with an uplink transmission, wherein the TCI states include a first TCI state and a second TCI state. The transceiver 23 is configured to receive the uplink transmission with the first TCI state and/or the second TCI state. This can solve issues in the prior art, utilize multi-transmission/reception point (TRP) reception, improve uplink reliability, provide a good communication performance, and/or provide high reliability. Further, the proposed some embodiments can enable a UE to efficiently transmit the uplink transmission (such as PUSCH or PUCCH) with two panels simultaneously so that the performance of uplink link would be improved.

Figure 3:
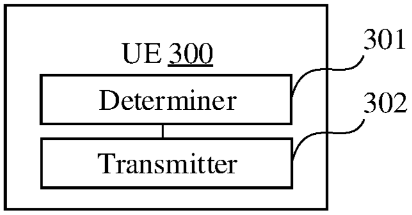
FIG. 3 is a block diagram of a UE according to an embodiment of the present disclosure.

FIG. 3 illustrates an example of a UE 300 according to an embodiment of the present application. The UE 300 is configured to implement some embodiments of the disclosure. Some embodiments of the disclosure may be implemented into the UE 300 using any suitably configured hardware and/or software. The UE 300 includes a determiner 301 and a transmitter 302. The determiner 301 is configured to determine a plurality of sounding reference signal (SRS) resource sets, wherein the SRS resource sets include a first SRS resource set and a second SRS resource set, the determiner 301 is configured to determine a plurality of transmission configuration indicator (TCI) states associated with an uplink transmission, wherein the TCI states include a first TCI state and a second TCI state, and the transmitter 302 is configured to transmit the uplink transmission with the first TCI state and/or the second TCI state. This can solve issues in the prior art, utilize multi-transmission/reception point (TRP) reception, improve uplink reliability, provide a good communication performance, and/or provide high reliability. Further, the proposed some embodiments can enable a UE to efficiently transmit the uplink transmission (such as PUSCH or PUCCH) with two panels simultaneously so that the performance of uplink link would be improved.

Figure 4:
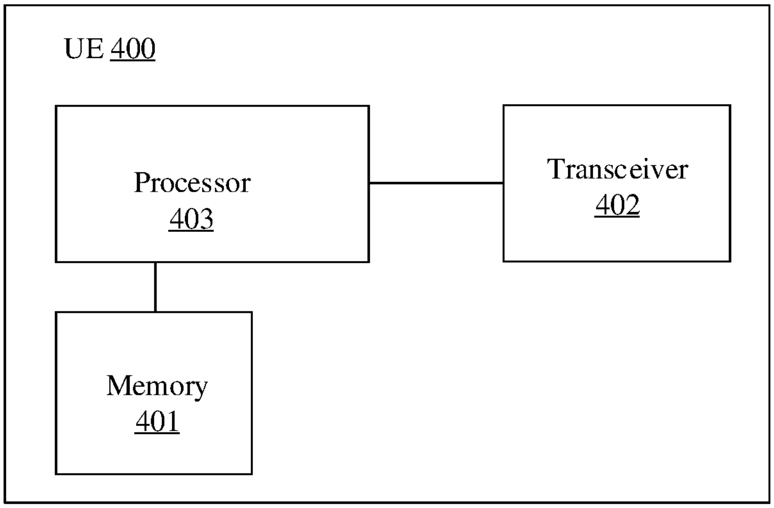
FIG. 4 is a block diagram of a UE according to an embodiment of the present disclosure.

FIG. 4 illustrates an example of a UE 400 according to an embodiment of the present disclosure. The UE 400 is configured to implement some embodiments of the disclosure. Some embodiments of the disclosure may be implemented into the UE 400 using any suitably configured hardware and/or software. The UE 400 may include a memory 401, a transceiver 402, and a processor 403 coupled to the memory 401 and the transceiver 402. The processor 403 may be configured to implement proposed functions, procedures and/or methods described in this description. Layers of radio interface protocol may be implemented in the processor 403. The memory 401 is operatively coupled with the processor 403 and stores a variety of information to operate the processor 403. The transceiver 402 is operatively coupled with the processor 403, and the transceiver 402 transmits and/or receives a radio signal. The processor 403 may include application-specific integrated circuit (ASIC), other chipset, logic circuit and/or data processing device. The memory 401 may include read-only memory (ROM), random access memory (RAM), flash memory, memory card, storage medium and/or other storage device. The transceiver 402 may include baseband circuitry to process radio frequency signals. When the embodiments are implemented in software, the techniques described herein can be implemented with modules (e.g., procedures, functions, and so on) that perform the functions described herein. The modules can be stored in the memory 401 and executed by the processor 403. The memory 401 can be implemented within the processor 403 or external to the processor 403 in which case those can be communicatively coupled to the processor 403 via various means as is known in the art.

In some embodiments, the processor 403 is configured, by a base station, with a plurality of sounding reference signal (SRS) resource sets, wherein the SRS resource sets include a first SRS resource set and a second SRS resource set. The processor 403 is further configured, by the base station, with a plurality of transmission configuration indicator (TCI) states associated with an uplink transmission, wherein the TCI states include a first TCI state and a second TCI state. The transceiver 402 is indicated, by the base station, to transmit the uplink transmission with the first TCI state and/or the second TCI state. This can solve issues in the prior art, utilize multi-transmission/reception point (TRP) reception, improve uplink reliability, provide a good communication performance, and/or provide high reliability. Further, the proposed some embodiments can enable a UE to efficiently transmit the uplink transmission (such as PUSCH or PUCCH) with two panels simultaneously so that the performance of uplink link would be improved.

Figure 5:
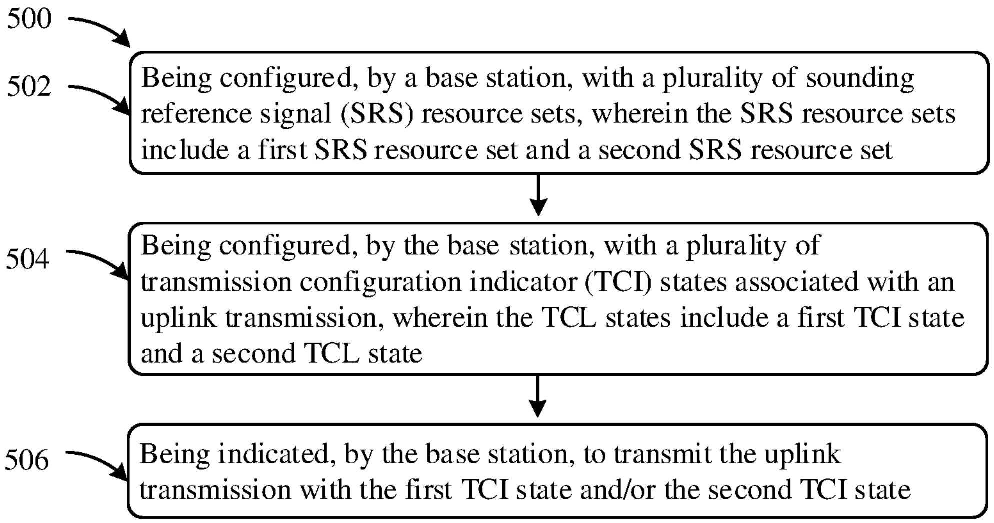
FIG. 5 is a flowchart illustrating a method of uplink transmission with multiple panels performed by a UE according to an embodiment of the present disclosure.

FIG. 5 is an example of a method 500 of uplink transmission with multiple panels performed by a UE according to an embodiment of the present disclosure. The method 500 of uplink transmission with multiple panels performed by a UE is configured to implement some embodiments of the disclosure. Some embodiments of the disclosure may be implemented into the method 500 of uplink transmission with multiple panels performed by a UE using any suitably configured hardware and/or software. In some embodiments, the method 500 of uplink transmission with multiple panels performed by a UE includes: an operation 502, being configured, by a base station, with a plurality of sounding reference signal (SRS) resource sets, wherein the SRS resource sets include a first SRS resource set and a second SRS resource set, an operation 504, being configured, by the base station, with a plurality of transmission configuration indicator (TCI) states associated with an uplink transmission, wherein the TCI states include a first TCI state and a second TCI state, and an operation 506, and being indicated, by the base station, to transmit the uplink transmission with the first TCI state and/or the second TCI state. This can solve issues in the prior art, utilize multi-transmission/reception point (TRP) reception, improve uplink reliability, provide a good communication performance, and/or provide high reliability. Further, the proposed some embodiments can enable a UE to efficiently transmit the uplink transmission (such as PUSCH or PUCCH) with two panels simultaneously so that the performance of uplink link would be improved.

In some embodiments, in a case where the UE is indicated, by the base station, to transmit the uplink transmission with the first TCI state, the uplink transmission is associated with the first SRS resource set; in a case where the UE is indicated, by the base station, to transmit the uplink transmission with the second TCI state, the uplink transmission is associated with the second SRS resource set; and/or in a case where the UE is indicated, by the base station, to transmit the uplink transmission with the first TCI state and the second TCI state, the uplink transmission is associated with the first SRS resource set and the second SRS resource set simultaneously.

In some embodiments, when the UE is indicated with one uplink SRS resource indicator (SRI) and/or one transmitted precoding matrix indicator (TPMI) for the uplink transmission through a downlink control information (DCI), the one SRI and/or the one TPMI is applied to the uplink transmission according to the first SRS resource set. In some embodiments, when the UE is indicated with one SRI and/or one TPMI for the uplink transmission through a DCI, the one SRI and/or the one TPMI is applied to the uplink transmission according to the second SRS resource set. In some embodiments, when the UE is indicated with a first SRI and a second SRI and/or a first TPMI and a second TPMI for the uplink transmission through a DCI, the first SRI and/or the first TPMI is applied to the uplink transmission according to the first SRS resource set, and the second SRI and/or the second TPMI is applied to the uplink transmission according to the second SRS resource set.

In some embodiments, the first TCI state and/or the second TCI state provides reference for determining an uplink transmission (Tx) spatial filter; and/or the first TCI state and/or the second TCI state is associated with a path loss-reference signal (PL-RS), at least one uplink power control parameter, an alpha, and/or a closed loop index for the uplink transmission. In some embodiments, the first TCI state and/or the second TCI state includes a joint TCI state or an uplink TCI state.

In some embodiments, the UE is provided with a high layer parameter to indicate that the UE is configured to transmit the uplink transmission with a multi-panel single frequency network (SFN) transmission. In some embodiments, when the UE is configured to transmit the uplink transmission with the first TCI state and the second TCI state simultaneously, the UE is requested to calculate a Tx power on the uplink transmission that is transmitted with both the first TCI state and the second TCI state. In some embodiments, the uplink transmission includes a physical uplink shared channel (PUSCH) transmission or a physical uplink control channel (PUCCH) transmission.

Figure 6:
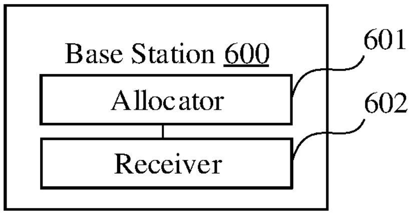
FIG. 6 is a block diagram of a base station according to an embodiment of the present disclosure.

FIG. 6 illustrates an example of base station 600 according to an embodiment of the present application. The base station 600 is configured to implement some embodiments of the disclosure. Some embodiments of the disclosure may be implemented into the base station 600 using any suitably configured hardware and/or software. The base station 600 includes includes an allocator 601 and a receiver 602. The allocator is configured to allocate, to a user equipment (UE), a plurality of sounding reference signal (SRS) resource sets, wherein the SRS resource sets include a first SRS resource set and a second SRS resource set. The allocator is further configured to allocate, to the UE, a plurality of transmission configuration indicator (TCI) states associated with an uplink transmission, wherein the TCI states include a first TCI state and a second TCI state. The receiver 602 is configured to receive, from the UE, the uplink transmission with the first TCI state and/or the second TCI state. This can solve issues in the prior art, utilize multi-transmission/reception point (TRP) reception, improve uplink reliability, provide a good communication performance, and/or provide high reliability. Further, the proposed some embodiments can enable a UE to efficiently transmit the uplink transmission (such as PUSCH or PUCCH) with two panels simultaneously so that the performance of uplink link would be improved.

Figure 7:
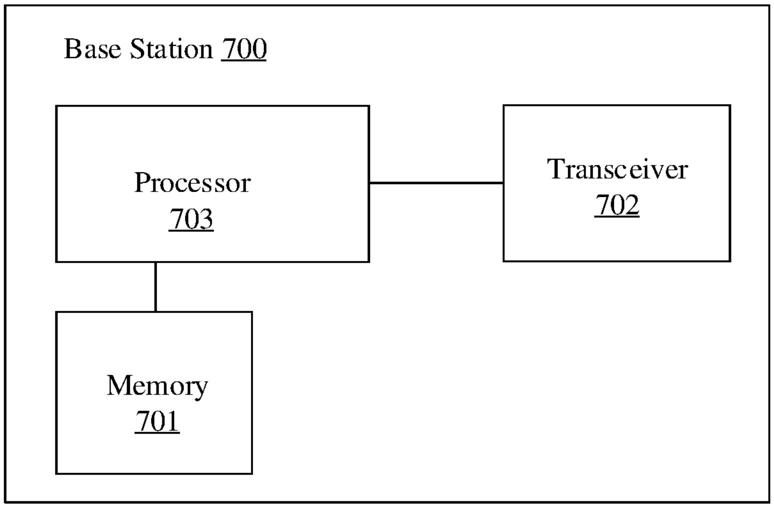
FIG. 7 is a block diagram of a base station according to an embodiment of the present disclosure.

FIG. 7 illustrates an example of a base station 700 according to an embodiment of the present disclosure. The base station 700 is configured to implement some embodiments of the disclosure. Some embodiments of the disclosure may be implemented into the base station 700 using any suitably configured hardware and/or software. The base station 700 may include a memory 701, a transceiver 702, and a processor 703 coupled to the memory 701 and the transceiver 702. The processor 703 may be configured to implement proposed functions, procedures and/or methods described in this description. Layers of radio interface protocol may be implemented in the processor 703. The memory 701 is operatively coupled with the processor 703 and stores a variety of information to operate the processor 703. The transceiver 702 is operatively coupled with the processor 703, and the transceiver 702 transmits and/or receives a radio signal. The processor 703 may include application-specific integrated circuit (ASIC), other chipset, logic circuit and/or data processing device. The memory 701 may include read-only memory (ROM), random access memory (RAM), flash memory, memory card, storage medium and/or other storage device. The transceiver 702 may include baseband circuitry to process radio frequency signals. When the embodiments are implemented in software, the techniques described herein can be implemented with modules (e.g., procedures, functions, and so on) that perform the functions described herein. The modules can be stored in the memory 701 and executed by the processor 703. The memory 701 can be implemented within the processor 703 or external to the processor 703 in which case those can be communicatively coupled to the processor 703 via various means as is known in the art.

In some embodiments, the processor 703 may configure, to a user equipment (UE), a plurality of sounding reference signal (SRS) resource sets, wherein the SRS resource sets include a first SRS resource set and a second SRS resource set, and theprocessor 703 may further configure, to the UE, a plurality of transmission configuration indicator (TCI) states associated with an uplink transmission, wherein the TCI states include a first TCI state and a second TCI state. The transceiver 702 is configured to receive, from the UE, the uplink transmission with the first TCI state and/or the second TCI state. This can solve issues in the prior art, utilize multi-transmission/reception point (TRP) reception, improve uplink reliability, provide a good communication performance, and/or provide high reliability. Further, the proposed some embodiments can enable a UE to efficiently transmit the uplink transmission (such as PUSCH or PUCCH) with two panels simultaneously so that the performance of uplink link would be improved.

Figure 8:
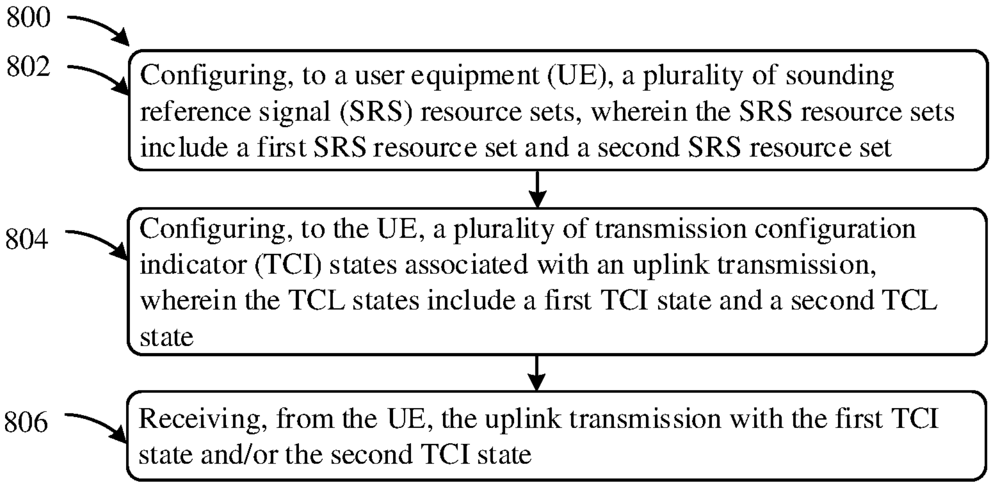
FIG. 8 is a flowchart illustrating a method of uplink transmission with multiple panels performed by a base station according to an embodiment of the present disclosure.

FIG. 8 is an example of a method 800 of uplink transmission with multiple panels performed by a base station according to an embodiment of the present disclosure. The method 800 of uplink transmission with multiple TCI states performed by the base station is configured to implement some embodiments of the disclosure. Some embodiments of the disclosure may be implemented into the method 800 of uplink transmission with multiple TCI states performed by the base station using any suitably configured hardware and/or software. In some embodiments, the method 800 of uplink transmission with multiple TCI states performed by the base station includes: an operation 802, configuring, to a user equipment (UE), a plurality of sounding reference signal (SRS) resource sets, wherein the SRS resource sets include a first SRS resource set and a second SRS resource set, an operation 804, configuring, to the UE, a plurality of transmission configuration indicator (TCI) states associated with an uplink transmission, wherein the TCI states include a first TCI state and a second TCI state, and an operation 806, receiving, from the UE, the uplink transmission with the first TCI state and/or the second TCI state. This can solve issues in the prior art, utilize multi-transmission/reception point (TRP) reception, improve uplink reliability, provide a good communication performance, and/or provide high reliability. Further, the proposed some embodiments can enable a UE to efficiently transmit the uplink transmission (such as PUSCH or PUCCH) with two panels simultaneously so that the performance of uplink link would be improved.

In some embodiments, in a case where the base station receives the uplink transmission with the first TCI state, the uplink transmission is associated with the first SRS resource set; in a case where the base station receives the uplink transmission with the second TCI state, the uplink transmission is associated with the second SRS resource set; and/or in a case where the base station receives the uplink transmission with the first TCI state and the second TCI state, the uplink transmission is associated with the first SRS resource set and the second SRS resource set simultaneously.

In some embodiments, when the base station indicates to the UE, one uplink SRS resource indicator (SRI) and/or one transmitted precoding matrix indicator (TPMI) for the uplink transmission through a downlink control information (DCI), the one SRI and/or the one TPMI is applied to the uplink transmission according to the first SRS resource set. In some embodiments, when the base station indicates to the UE, one SRI and/or one TPMI for the uplink transmission through a DCI, the one SRI and/or the one TPMI is applied to the uplink transmission according to the second SRS resource set. In some embodiments, when the base station indicates to the UE, a first SRI and a second SRI and/or a first TPMI and a second TPMI for the uplink transmission through a DCI, the first SRI and/or the first TPMI is applied to the uplink transmission according to the first SRS resource set, and the second SRI and/or the second TPMI is applied to the uplink transmission according to the second SRS resource set.

In some embodiments, the first TCI state and/or the second TCI state provides reference for determining an uplink transmission (Tx) spatial filter; and/or the first TCI state and/or the second TCI state is associated with a path loss-reference signal (PL-RS), at least one uplink power control parameter, an alpha, and/or a closed loop index for the uplink transmission. In some embodiments, the first TCI state and/or the second TCI state includes a joint TCI state or an uplink TCI state. In some embodiments, the base station provides to the UE, a high layer parameter to indicate the UE to transmit the uplink transmission with a multi-panel single frequency network (SFN) transmission. In some embodiments, the base station requests the UE to calculate a Tx power on the uplink transmission that is transmitted with both the first TCI state and the second TCI state. In some embodiments, the uplink transmission includes a physical uplink shared channel (PUSCH) transmission or a physical uplink control channel (PUCCH) transmission.

Exemplary Technical Solutions

In some embodiments, a UE can be configured with two SRS resource sets with a first usage or a second usage. The first usage may be codebook. The first usage may be noncodebook. The UE can also be provided with two TCI states for an uplink transmission (such as PUSCH transmission): a first TCI state and a second TCI state. The TCI state can be a joint TCI state or an uplink TCI state. An uplink TCI state contains one a reference RS that provides reference for determining UL Tx spatial filter and in a joint TCI state, the RS configured with qcl-Type set to TypeD provides reference for determining UL Tx spatial filter. The uplink TCI state can be associated with a path loss-reference signal (PL-RS) for PUSCH transmission, and uplink at least one power control parameter P0, alpha and closed loop index for PUSCH transmission. The joint TCI state can be associated with a PL-RS for PUSCH transmission and uplink at least one power control parameter P0, alpha and closed loop index for PUSCH transmission. The UE can be configured or indicated to transmit a PUSCH. The UE can be requested/indicated to transmit the PUSCH with the first TCI state and assume the PUSCH is associated with the first SRS resource set. The UE can be requested/indicated to transmit the PUSCH with the second TCI state and assume the PUSCH is associated with the second SRS resource set. The UE can be requested/indicated to transmit the PUSCH with the first TCI state and the second TCI state and assume the PUSCH is associated with the first SRS resource set and the second SRS resource set simultaneously.

In some examples, when the UE is indicated to transmit PUSCH that is associated with the first SRS resource set and is with the first TCI state, the UE can be indicated with one SRI, one TPMI through the DCI fields in for example DCI format 0_1 or 0_2. The UE applies the indicated SRI and TPMI to the indicated PUSCH transmission. Further, the UE transmits the PUSCH according to the UL Tx spatial filter determined from the first TCI state, and the UE calculates the Tx power for the PUSCH transmission according to the PL-RS and at least one power control parameter associated with the first TCI state.

In some examples, when the UE is indicated to transmit PUSCH that is associated with the second SRS resource set and is with the second TCI state, the UE can be indicated with one SRI and/or one TPMI through the DCI fields in for example DCI format 0_1 or 0_2. The UE applies the indicated SRI and/or TPMI to the indicated PUSCH transmission. Further, the UE transmits the PUSCH according to the UL Tx spatial filter determined from the first TCI state, and the UE calculates the Tx power for the PUSCH transmission according the PL-RS and at least one power control parameter associated with the second TCI state.

In some examples, when the UE is indicated to transmit PUSCH being associated with both the first SRS resource set and the second SRS resource set and with the first TCI state and the second TCI state, the UE can be indicated with two SRIs and/or two TPMIs through the DCI fields in for example DCI format 0_1 or 0_2. The UE applies the first SRI and/or the first TPMI to the PUSCH according to the first SRS resource set and the UE also applies the second SRI and/or the second TPMI to the same PUSCH according to the second SRS resource set. For the PUSCH associated with the first SRS resource set, the UE applies the Tx power calculated according to the PL-RS and uplink at least one power control parameter associated with the first TCI state and for the PUSCH associated with the second SRS resource set, the UE applies the Tx power calculated according to the PL-RS and uplink at least one power control parameter associated with the second TCI state.

In some exemplary methods, the UE can be provided with one high layer parameter to indicate that the UE is configured to transmit the PUSCH with a multi-panel SFN transmission. With the configuration, the DCI format can dynamically indicate the UE to transmit the PUSCH with a first panel, a second panel, or with both the first panel and the second panel.

For example, a DCI format 0_1 or 0_2 can indicate that the first SRS resource set is associated with the scheduled PUSCH transmission. In some examples, the DCI field SRS resource set indicator with codepoint 00 can indicate that. With that, the UE transmits the PUSCH with the association with the first SRS resource set and the first TCI state.

For example, a DCI format 0_1 or 0_2 can indicate that the second SRS resource set is associated with the scheduled PUSCH transmission. In one example, the DCI field SRS resource set indicator with codepoint 01 can indicate that. With that, the UE transmits the PUSCH with the association with the second SRS resource set and the second TCI state.

For example, a DCI format 0_1 or 0_2 can indicate that both the first SRS resource set and the second SRS resource set are associated with the scheduled PUSCH transmission. With that, the UE transmits the PUSCH with the association with the first SRS resource set and the second SRS resource set and the first TCI state and the second TCI state.

In some examples, the DCI field SRS resource set indicator with codepoint 10 can indicate that the PUSCH is associated with the first SRS resource set and the first TCI state and the second SRS resource set and the second TCI state. In other word, the UE applies the SRI and/or TPMI corresponding to the first SRS resource set and the UL Spatial Tx filter and Tx power according to the first TCI state on PUSCH and the UE applies the SRI and/or TPMI corresponding to the second SRS resource set and the UL Spatial Tx filter and Tx power according to the second TCI state on PUSCH.

In some examples, the DCI field SRS resource set indicator with codepoint 11 can indicate that the PUSCH is associated with the first SRS resource set and the second TCI state and the second SRS resource set and the first TCI state. In other word, the UE applies the SRI and/or TPMI corresponding to the first SRS resource set and the UL Spatial Tx filter and Tx power according to the second TCI state on PUSCH and the UE applies the SRI and/or TPMI corresponding to the second SRS resource set and the UL Spatial Tx filter and Tx power according to the first TCI state on PUSCH.

The UE can be requested to calculate the Tx power on PUSCH that is transmitted with both the first TCI state and the second TCI state:

In some exemplary methods, the UE is provided with a Tx power limit Pcmax for both TCI states. The Pcmax is the total Tx power of all PUSCH parts with both TCI states. With that, the UE can be requested to calculate the Tx power of PUSCH part associated with the first TCI state and the second TCI state accordingly.

The UE first calculates the Tx power associated with the first TCI state:

$$\tilde{P_1} = \begin{cases} P_{cmax} \\ P_{0,1} + 10\log_{10}(2^{\mu}M) + \alpha_1 PL_1 + \Delta + f_1 \end{cases}$$

The UE calculates the Tx power associated with the second TCI state:

$$\tilde{P_2} = \begin{cases} P_{cmax} \\ P_{0,2} + 10\log_{10}(2^{\mu}M) + \alpha_2 PL_2 + \Delta + f_2 \end{cases}$$

Then the UE can determine the Tx power, $P_1$, for PUSCH associated with the first TCI state and Tx power, $P_2$, for the PUSCH associated with the second TCI state as follows:

If $10^{\widetilde{P_1}/10} + 10^{\widetilde{P_2}/10} \leq 10^{P_{cmax}/10}$, $P_1 = \widetilde{P_1}$ and $P_2 = \widetilde{P_2}$, otherwise, $P_1 = \widetilde{P_1} - \delta$ and $P_2 = \widetilde{P_2} - \delta$ with $\delta = 10 \log_{10}(10^{\widetilde{P_2}/10} + 10^{\widetilde{P_2}/10}) - P_{cmax}$.

In some exemplary methods, the UE is provided with Tx power limit Pcmax for each of the first TCI state and the second TCI state. Then the UE can be requested to determine the Tx power for the PUSCH associated with the first TCI state according the PL-RS and at least one power control parameter associated with the first TCI state and the Pcmax for the first TCI state. And the UE can be requested to determine the Tx power for the PUSCH associated with the first TCI state according the PL-RS and at least one power control parameter associated with the second TCI state and the Pcmax for the second TCI state.

In some embodiments, a UE can be provided with two TCI states for a first PUCCH resource: a first TCI state and a second TCI state. The TCI state can be a joint TCI state or uplink TCI state. The uplink TCI state can be associated with a PL-RS for PUCCH transmission, and uplink at least one power control parameter P0 and closed loop index for PUCCH transmission. The joint TCI state can be associated with a PL-RS for PUCCH transmission and uplink at least one power control parameter P0 and closed loop index for PUCCH transmission. The UE can be requested/indicated to transmit the PUCCH with both the first TCI state and the second TCI state simultaneously.

In some examples, when the UE is configured to transmit one PUCCH with the first TCI state and the second TCI state simultaneously, the UE can be requested to calculate the Tx power on PUCCH that is transmitted with both the first TCI state and the second TCI state as follows:

In some exemplary methods, the UE is provided with a Tx power limit Pcmax for both TCI states. The Pcmax is the total Tx power of all PUCCH transmission with both TCI states. With that, the UE can be requested to calculate the Tx power of PUCCH part associated with the first TCI state and the second TCI state accordingly:

The UE first calculates the Tx power associated with the first TCI state:

$$\tilde{P_1} = \begin{cases} P_{cmax} \\ P_{0,1} + 10\log_{10}(2^{\mu}M) + PL_1 + \Delta + f_1 \end{cases}$$

The UE calculates the Tx power associated with the second TCI state:

$$\tilde{P_2} = \begin{cases} P_{cmax} \\ P_{0,2} + 10\log_{10}(2^{\mu}M) + \alpha_2 PL_2 + \Delta + f_2 \end{cases}$$

Then the UE can determine the Tx power, $P_1$, for PUCCH associated with the first TCI state and Tx power, $P_2$, for the PUSCH associated with the second TCI state as follows:

If $10^{\widetilde{P_1}/10} + 10^{\widetilde{P_2}/10} \leq 10^{P_{cmax}/10}$, $P_1 = \widetilde{P_1}$ and $P_2 = \widetilde{P_2}$, otherwise, $P_1 = \widetilde{P_1} - \delta$ and $P_2 = \widetilde{P_2} - \delta$ with $\delta = 10 \log_{10}(10^{\widetilde{P_1}/10} + 10^{\widetilde{P_2}/10}) - P_{cmax}$.

In some exemplary methods, the UE is provided with Tx power limit Pcmax for each of the first TCI state and the second TCI state. Then the UE can be requested to determine the Tx power for the PUCCH associated with the first TCI state according the PL-RS and at least one power control parameter associated with the first TCI state and the Pcmax for the first TCI state. And the UE can be requested to determine the Tx power for the PUCCH associated with the first TCI state according to the PL-RS and at least one power control parameter associated with the second TCI state and the Pcmax for the second TCI state.

Commercial interests for some embodiments are as follows. 1. Solve issues in the prior art. 2. Utilize multi-transmission/reception point (TRP) reception. 3. Improve uplink reliability. 4. Provide a good communication performance. 6. Provide high reliability. 7. Further, the proposed some embodiments can enable a UE to efficiently transmit the uplink transmission (such as PUSCH or PUCCH) with two panels simultaneously so that the performance of uplink link would be improved. Some embodiments of the present disclosure are used by chipset vendors, video system development vendors, automakers including cars, trains, trucks, buses, bicycles, moto-bikes, helmets, and etc., drones (unmanned aerial vehicles), smartphone makers, communication devices for public safety use, AR/VR/MR device maker for example gaming, conference/seminar, education purposes. Some embodiments of the present disclosure are a combination of "techniques/processes" that can be adopted in video standards to create an end product. Some embodiments of the present disclosure propose technical mechanisms. The at least one proposed solution, method, system, and apparatus of some embodiments of the present disclosure may be used for current and/or new/future standards regarding communication systems such as a UE, a base station, and/or a communication system. Compatible products follow at least one proposed solution, method, system, and apparatus of some embodiments of the present disclosure. The proposed solution, method, system, and apparatus are widely used in a UE, a base station, and/or a communication system. With the implementation of the at least one proposed solution, method, system, and apparatus of some embodiments of the present disclosure, at least one modification to methods and apparatus of uplink transmission with multiple panels are considered for standardizing.

Figure 9:
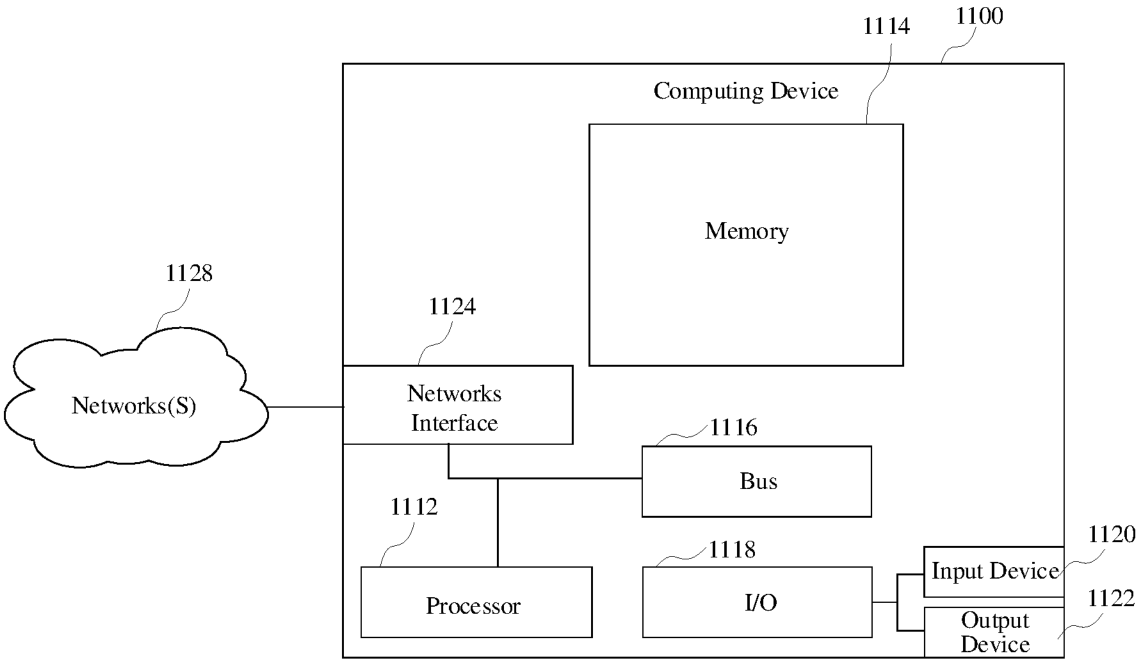
FIG. 9 is a block diagram of an example of a computing device according to an embodiment of the present disclosure.

FIG. 9 is an example of a computing device 1100 according to an embodiment of the present disclosure. Any suitable computing device can be used for performing the operations described herein. For example, FIG. 9 illustrates an example of the computing device 1100 that can implement the communication network system of FIG. 2, the UE of FIG. 3, the UE of FIG. 4, the base station of FIG. 6, the base station of FIG. 7, the method of FIG. 1A, FIG. 1B, FIG. 5, or FIG. 8, using any suitably configured hardware and/or software. In some embodiments, the computing device 1100 can include a processor 1112 that is communicatively coupled to a memory 1114 and that executes computer-executable program code and/or accesses information stored in the memory 1114. The processor 1112 may include a microprocessor, an application-specific integrated circuit ("ASIC"), a state machine, or other processing device. The processor 1112 can include any of a number of processing devices, including one. Such a processor can include or may be in communication with a computer-readable medium storing instructions that, when executed by the processor 1112, cause the processor to perform the operations described herein.

The memory 1114 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, a memory chip, a read-only memory (ROM), a random access memory (RAM), an application specific integrated circuit (ASIC), a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C #, visual basic, java, python, perl, javascript, and actionscript.

The computing device 1100 can also include a bus 1116. The bus 1116 can communicatively couple one or more components of the computing device 1100. The computing device 1100 can also include a number of external or internal devices such as input or output devices. For example, the computing device 1100 is illustrated with an input/output ("I/O") interface 1118 that can receive input from one or more input devices 1120 or provide output to one or more output devices 1122. The one or more input devices 1120 and one or more output devices 1122 can be communicatively coupled to the I/O interface 1118. The communicative coupling can be implemented via any suitable manner (e.g., a connection via a printed circuit board, connection via a cable, communication via wireless transmissions, etc.). Non-limiting examples of input devices 1120 include a touch screen (e g., one or more cameras for imaging a touch area or pressure sensors for detecting pressure changes caused by a touch), a mouse, a keyboard, or any other device that can be used to generate input events in response to physical actions by a user of a computing device. Non-limiting examples of output devices 1122 include a liquid crystal display (LCD) screen, an external monitor, a speaker, or any other device that can be used to display or otherwise present outputs generated by a computing device.

The computing device 1100 can execute program code that configures the processor 1112 to perform one or more of the operations described above with respect to FIG. 1A, FIG. 1B, FIG. 5, or FIG. 8. The program code may be resident in the memory 1114 or any suitable computer-readable medium and may be executed by the processor 1112 or any other suitable processor.

The computing device 1100 can also include at least one network interface device 1124. The network interface device 1124 can include any device or group of devices suitable for establishing a wired or wireless data connection to one or more data networks 1128. Non limiting examples of the network interface device 1124 include an Ethernet network adapter, a modem, and/or the like. The computing device 1100 can transmit messages as electronic or optical signals via the network interface device 1124.

Figure 10:
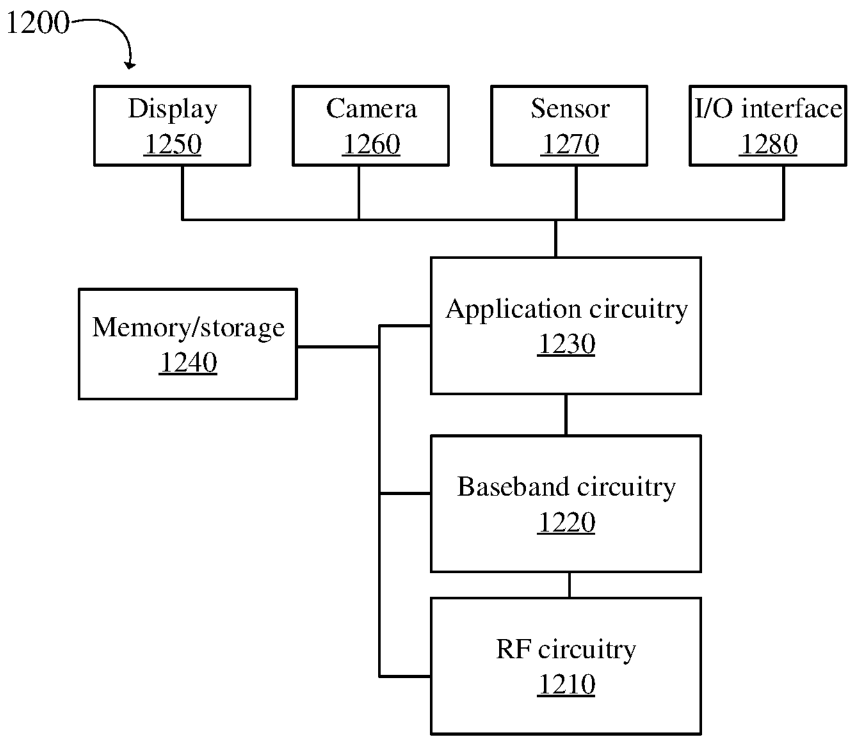
FIG. 10 is a block diagram of a communication system according to an embodiment of the present disclosure.

FIG. 10 is a block diagram of an example of a communication system 1200 according to an embodiment of the present disclosure. Embodiments described herein may be implemented into the communication system 1200 using any suitably configured hardware and/or software. FIG. 10 illustrates the communication system 1200 including a radio frequency (RF) circuitry 1210, a baseband circuitry 1220, an application circuitry 1230, a memory/storage 1240, a display 1250, a camera 1260, a sensor 1270, and an input/output (I/O) interface 1280, coupled with each other at least as illustrated.

The application circuitry 1230 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system. The communication system 1200 can execute program code that configures the application circuitry 1230 to perform one or more of the operations described above with respect to FIG. 1A, FIG. 1B, FIG. 5, or FIG. 8. The program code may be resident in the application circuitry 1230 or any suitable computer-readable medium and may be executed by the application circuitry 1230 or any other suitable processor.

The baseband circuitry 1220 may include circuitry such as, but not limited to, one or more single-core or multi-core processors. The processors may include a baseband processor. The baseband circuitry may handle various radio control functions that may enable communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 1220 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 1210 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 1210 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the communication network system of FIG. 2, the UE of FIG. 3, the UE of FIG. 4, the base station of FIG. 6, or the base station of FIG. 7 may be embodied in whole or in part in one or more of the RF circuitry, the baseband circuitry, and/or the application circuitry. As used herein, "circuitry" may refer to, be part of, or include an application specific integrated circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 1240 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 1280 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 1270 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 1250 may include a display, such as a liquid crystal display and a touch screen display. In various embodiments, the communication system 1200 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A method of uplink transmission with multiple panels, by a user equipment (UE), comprising:

being configured, by a base station, with a plurality of sounding reference signal (SRS) resource sets, wherein the SRS resource sets comprise a first SRS resource set and a second SRS resource set;

being configured, by the base station, with a plurality of transmission configuration indicator (TCI) states associated with an uplink transmission, wherein the TCI states comprise a first TCI state and a second TCI state; and being indicated, by the base station, to transmit the uplink transmission with the first TCI state and/or the second TCI state;

wherein the UE is provided with a high layer parameter to indicate that the UE is configured to transmit the uplink transmission with a multi-panel single frequency network (SFN) transmission;

wherein a downlink control information (DCI) field SRS resource set indicator with codepoint 10 indicates that the uplink transmission is associated with the first SRS resource set, the first TCI state, the second SRS resource set and the second TCI state.

2. The method of claim 1, wherein:

in a case where the UE is indicated, by the base station, to transmit the uplink transmission with the first TCI state, the uplink transmission is associated with the first SRS resource set;

in a case where the UE is indicated, by the base station, to transmit the uplink transmission with the second TCI state, the uplink transmission is associated with the second SRS resource set; and/or in a case where the UE is indicated, by the base station, to transmit the uplink transmission with the first TCI state and the second TCI state, the uplink transmission is associated with the first SRS resource set and the second SRS resource set simultaneously.

3. The method of claim 2, wherein:

when the UE is indicated with one uplink SRS resource indicator (SRI) and/or one transmitted precoding matrix indicator (TPMI) for the uplink transmission through a DCI, the one SRI and/or the one TPMI is applied to the uplink transmission according to the first SRS resource set.

4. The method of claim 2, wherein:

when the UE is indicated with one SRS resource indicator (SRI) and/or one transmitted precoding matrix indicator (TPMI) for the uplink transmission through a DCI, the one SRI and/or the one TPMI is applied to the uplink transmission according to the second SRS resource set.

5. The method of claim 2, wherein:

when the UE is indicated with a first SRS resource indicator (SRI) and a second SRI and/or a first transmitted precoding matrix indicator (TPMI) and a second TPMI for the uplink transmission through a DCI, the first SRI and/or the first TPMI is applied to the uplink transmission according to the first SRS resource set, and the second SRI and/or the second TPMI is applied to the uplink transmission according to the second SRS resource set.

6. The method of claim 1, wherein:

the first TCI state and/or the second TCI state provides reference for determining an uplink transmission (Tx) spatial filter; and/or the first TCI state and/or the second TCI state is associated with a path loss-reference signal (PL-RS), at least one uplink power control parameter, an alpha, and/or a closed loop index for the uplink transmission.

7. The method of claim 6, wherein the first TCI state and/or the second TCI state comprises a joint TCI state or an uplink TCI state.

8. The method of claim 1, wherein when the UE is configured to transmit the uplink transmission with the first TCI state and the second TCI state simultaneously, the UE is requested to calculate a transmission (Tx) power on the uplink transmission that is transmitted with both the first TCI state and the second TCI state.

9. The method of claim 1, wherein the uplink transmission comprises a physical uplink shared channel (PUSCH) transmission or a physical uplink control channel (PUCCH) transmission.

10. The method of claim 1, wherein the UE is dynamically indicated via a DCI format to transmit the uplink transmission with a first panel, a second panel or with both the first panel and the second panel.

11. A user equipment (UE), comprising:

a memory;

a transceiver; and a processor coupled to the memory and the transceiver;

wherein the processor is configured, by a base station, with a plurality of sounding reference signal (SRS) resource sets, wherein the SRS resource sets comprise a first SRS resource set and a second SRS resource set;

wherein the processor is configured, by the base station, with a plurality of transmission configuration indicator (TCI) states associated with an uplink transmission, wherein the TCI states comprise a first TCI state and a second TCI state; and wherein the transceiver is indicated, by the base station, to transmit the uplink transmission with the first TCI state and/or the second TCI state;

wherein the UE is provided with a high layer parameter to indicate that the UE is configured to transmit the uplink transmission with a multi-panel single frequency network (SFN) transmission;

wherein a downlink control information (DCI) field SRS resource set indicator with codepoint 10 indicates that the uplink transmission is associated with the first SRS resource set, the first TCI state, the second SRS resource set and the second TCI state.

12. The UE of claim 11, wherein:

in a case where the UE is indicated, by the base station, to transmit the uplink transmission with the first TCI state, the uplink transmission is associated with the first SRS resource set;

in a case where the UE is indicated, by the base station, to transmit the uplink transmission with the second TCI state, the uplink transmission is associated with the second SRS resource set; and/or in a case where the UE is indicated, by the base station, to transmit the uplink transmission with the first TCI state and the second TCI state, the uplink transmission is associated with the first SRS resource set and the second SRS resource set simultaneously.

13. The UE of claim 12, wherein:

when the UE is indicated with one uplink SRS resource indicator (SRI) and/or one transmitted precoding matrix indicator (TPMI) for the uplink transmission through a DCI, the one SRI and/or the one TPMI is applied to the uplink transmission according to the first SRS resource set.

14. The UE of claim 12, wherein:

when the UE is indicated with one SRS resource indicator (SRI) and/or one transmitted precoding matrix indicator (TPMI) for the uplink transmission through a DCI, the one SRI and/or the one TPMI is applied to the uplink transmission according to the second SRS resource set.

15. The UE of claim 12, wherein:

when the UE is indicated with a first SRS resource indicator (SRI) and a second SRI and/or a first transmitted precoding matrix indicator (TPMI) and a second TPMI for the uplink transmission through a DCI, the first SRI and/or the first TPMI is applied to the uplink transmission according to the first SRS resource set, and the second SRI and/or the second TPMI is applied to the uplink transmission according to the second SRS resource set.

16. The UE of claim 11, wherein:

the first TCI state and/or the second TCI state provides reference for determining an uplink transmission (Tx) spatial filter; and/or the first TCI state and/or the second TCI state is associated with a path loss-reference signal (PL-RS), at least one uplink power control parameter, an alpha, and/or a closed loop index for the uplink transmission.

17. The UE of claim 16, wherein the first TCI state and/or the second TCI state comprises a joint TCI state or an uplink TCI state.

18. The UE of claim 11, wherein when the UE is configured to transmit the uplink transmission with the first TCI state and the second TCI state simultaneously, the UE is requested to calculate a transmission (Tx) power on the uplink transmission that is transmitted with both the first TCI state and the second TCI state.

19. The UE of claim 11, wherein the uplink transmission comprises a physical uplink shared channel (PUSCH) transmission or a physical uplink control channel (PUCCH) transmission.

20. The UE of claim 11, wherein the UE is dynamically indicated via a DCI format to transmit the uplink transmission with a first panel, a second panel or with both the first panel and the second panel.

* * * * *